Patented June 14, 1932

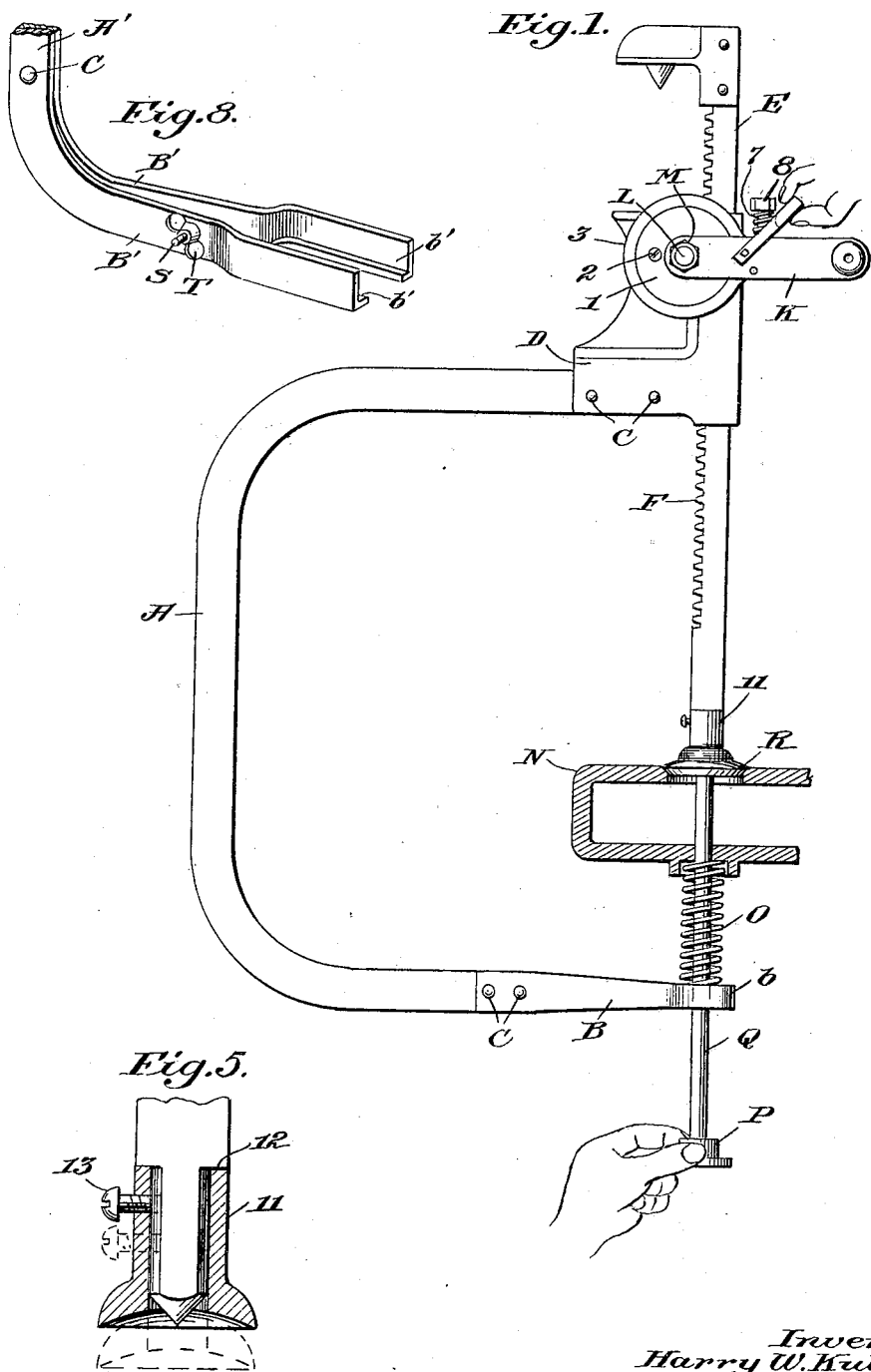

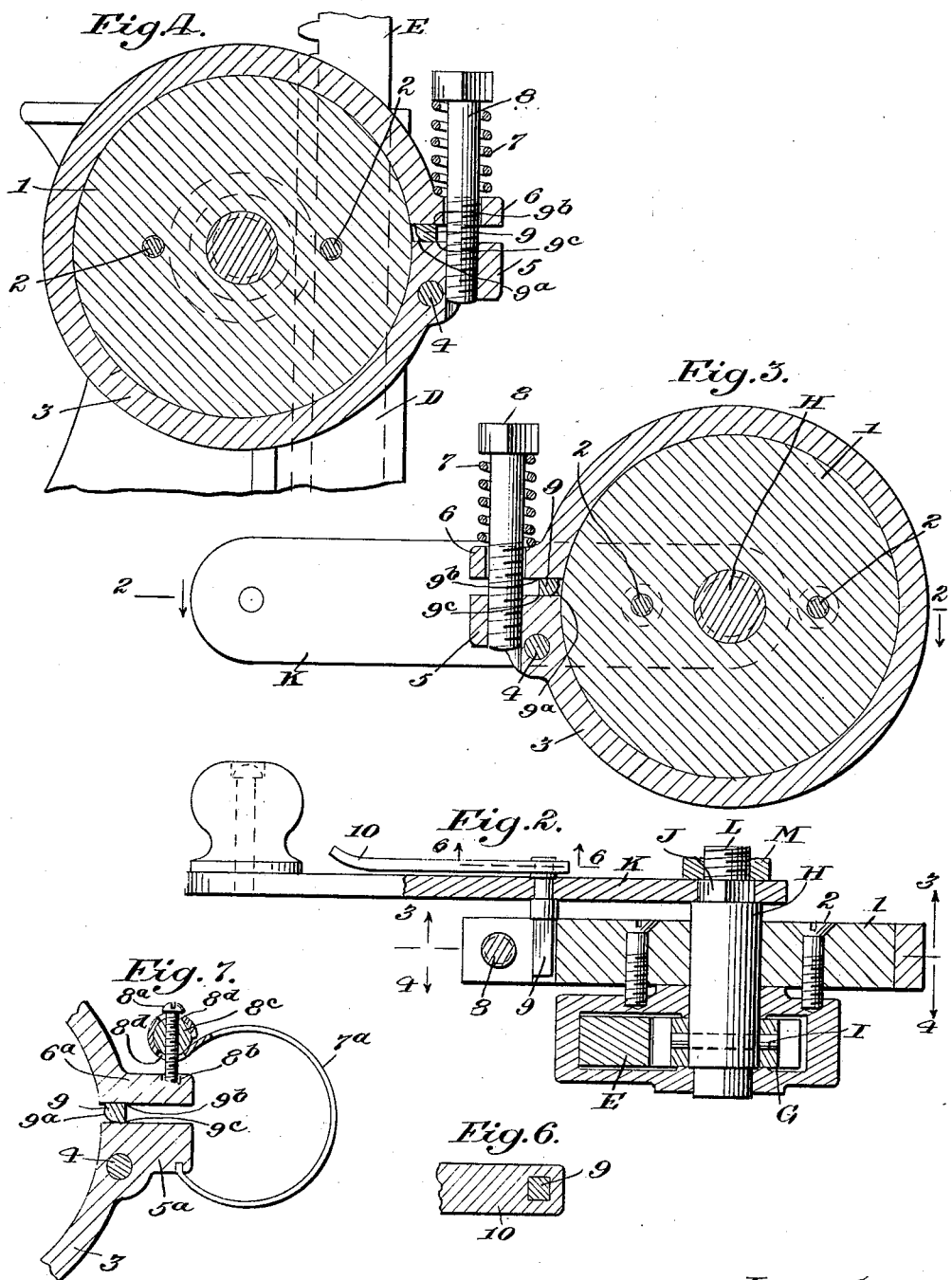

1,862,792

UNITED STATES PATENT OFFICE

HARRY W. KULP AND MARTIN C. DELLINGER, OF LANCASTER, PENNSYLVANIA

VALVE-SPRING LIFTER

Application filed June 12, 1929. Serial No. 370,255.

This invention relates to valve-spring lifters and compressors for use in connection with internal combustion engines.

The primary objects of the present invention are, to provide a pinion and rack-bar type valve-spring lifter with very simple efficient means for holding the rack-bar and cooperating elements in any desired adjusted relation in opposition to the thrust of the valve-spring; to provide a holding or braking means which in operation will yield in one direction under relatively small additional force to permit the further lifting or compression of the valve-spring, while tending to bind more tightly on application of power in the reverse direction; and to provide in such a holding or braking means release means so related to the holding means that the brake means will move bodily with said release means away from the mechanic's fingers with the brake means tending to overrun the release means, preventing a sudden release of the rack-bar and ensuring a very gradual and easily and instantly controlled release of the valve-spring.

In several makes of automobiles placed on the market in recent years, details of the valve-stems, and cooperating spring-retaining cups construction comprise a spreading, or mushrooming or other special construction of the lower end of the valve-stem in association with a special construction of retainer cup, collar or block applied to or fitting over the lower end of the valve-stem and having a face or faces conforming to the form thereof or cooperating therewith, and usually eliminating the cross-pins, said recent type being rather generally or loosely known as the mushroom type. In this mushroom type, particularly in connection with some special forms of retainer cups, collars or blocks, it is necessary to have the latter in a certain condition and a certain relation to the valve-stem and adjacent end of the valve-spring, which fits down over and around a reduced vertically extending portion of the retainer cup, collar or block in certain forms of the latter, so that, in practice, in replacing a retaining cup, collar or block of this type it is usual for the mechanic to place the same on the lower portion of the valve-stem, and hold it or the parts thereof in proper relation with the thumb and forefinger of one hand and then, with the other hand, operate the valve-spring lifter, or release elements thereof to let the lower end of the valve-spring down to normal operative position, it being important, of course, to let said spring down gradually and under as much control as possible to avoid injury to the thumb and forefinger holding the retaining cup, collar or washer, while ensuring the proper relation of the parts, and the present invention has the above considerations particularly in view, although, of course, being capable of, and very convenient for, use in connection with other internal combustion engines to which the above considerations do not apply.

In this application we show and describe only several embodiments of our invention simply by way of illustration of the practice thereof, as by law required. However, we are well aware that our invention is capable of other and different embodiments and that the various details thereof may be modified in different ways, all without departing from our said invention. Therefore, the drawings and description herein are to be considered as merely illustrative and not as exclusive.

In the accompanying drawings:

Figure 1 represents a side elevation of a valve-spring lifter or compressor embodying our invention as applied in use and in the act of lowering the lower end of the valve-spring;

Figure 2, a sectional view on line 2—2 of Fig. 3, looking in the direction of the arrows;

Figures 3 and 4, sectional views on line 3—3 of Fig. 2 looking in opposite directions as indicated by the arrows;

Figure 5, a detail sectional view through the adjustable rack-bar foot;

Figure 6, a detail sectional view on line 6—6 of Fig. 2, looking in the direction of the arrows;

Figure 7, a detail fragmentary view, partly in section, of a modification; and

Figure 8, a fragmentary perspective view of a further modification.

Referring now in detail to the drawings, A designates a valve-spring lifter frame, which may be of U-shape, as shown, or of any suitable shape, and which is provided on its lower end with a lifter jaw member B having its front end bifurcated and cupped to form jaws b and secured to said frame in any suitable manner, as by rivets C. On its upper end said frame A is provided with a housing D secured thereto in any suitable manner, as by rivets C, and formed with a straight sleeve or tubular portion having a passage extending through the same in alignment with the jaws b and receiving a rack-bar E for reciprocation in said sleeve portion toward and from the jaws b and in alignment therewith. Said rack-bar E is formed with teeth F to be engaged by the teeth of pinion G located in said housing in such position as to extend into said straight sleeve portion thereof so as to mesh with the teeth F of said rack-bar E. Pinion G is preferably secured to the shaft H to turn therewith in any suitable manner so that in assembled relation said shaft H and pinion G shall not be capable of movement relative to each other in any direction. Said parts H and G may be secured together in any usual and suitable manner, a cross-pin I driven through registering bores in said shaft H and pinion G and making a tight frictional fit therein being illustrated as one means of connection of said parts. However, any other suitable means to this end may be employed if said shaft H and pinion G be made as separate parts, as illustrated. However, it is not essential that they be made separate from each other, provided that the construction of the housing D is such as to permit the proper positioning therein, during assembly, of said pinion G and shaft H, nor is it essential that the connection between said pinion G and shaft H be such as to prevent relative movement between them endwise of the shaft so long as there is some provision in the tool for preventing endwise displacement of the shaft out of operative relation to the housing D and said pinion G.

In the embodiment illustrated the shaft H extends through opposing walls of the housing D and through a brake-drum 1 secured to one side face of said housing D in any suitable manner, screws 2 for this purpose being shown, and the pinion G being pinned to said shaft H between said opposing walls of the housing D prevents endwise movement of the shaft H to any substantial degree with relation to said housing. While the drum 1 is shown as a part separate from, and secured to, the housing D, it is not essential that it be a separate part, or that it be detachably secured to said housing, though it is preferred.

The shaft H has an end portion extending beyond the outer face of brake-drum 1 and squared as at J or of other non-circular cross-sectional form to fit in the correspondingly formed socket in the inner end portion of crank-lever K, and beyond said squared portion J it is formed with a reduced diameter externally screw-threaded portion L to receive the retaining nut M.

A relatively heavy resilient metal split brake-band 3 is disposed concentrically about the brake-drum 1 so as to have its inner face in contact at all, or substantially all, points with the outer peripheral face of said brake-drum 1 when said brake-band 3 is in contracted condition, and said brake-band 3 is connected with the crank-lever K by a pin 4 passing through said crank-lever K and the end lug 5 of said brake-band 3 as shown, whereby said brake-band 3 will move with said crank-lever K about the axis of said shaft H and said brake-drum 1.

A screw or bolt 8 passes freely through a perforation in the end lug 6 of said brake-band 3 and engages in the aligned internally screw-threaded bore in end lug 5, and a helical spring 7 interposed between the adjacent opposed faces of said end lug 6 and the head of said bolt 8 serves to force end lug 6 toward end lug 5, and the compression of said spring 7, and consequently the degree of frictional grip by said brake-band 3 on the brake-drum 1, may be adjusted as desired by turning said bolt 8 into or out of said end lug 5.

The end lugs 5 and 6 of the brake-band 3 have wide substantially parallel faces disposed adjacent each other on opposite sides of an intervening spreading wedge or cam member 9 mounted for rotation in crank-lever K and having a forward end portion extending beyond the front face of said lever K and receiving thereon to turn therewith a lever 10. The socket in the lever 10 receiving said forward end portion, and said forward end portion, may be square in cross-section, as illustrated in Fig. 6, or of other non-circular outline, and the portion of spreading wedge of cam member 9 extending between the opposed faces of end lugs 5 and 6 will be, in cross-section, of greater length than width, and preferably of angular shape with one side in, or substantially in, contact with the opposed face of end lug 5 when said member is in the position shown in Figures 3 and 4, so that when the lever 10 is moved into alignment with crank-lever K the end lugs 5 and 6 will be forced together by the spring 7 toward or against the sides of the wedge or cam member 9, thus contracting the brake-band 3 as a whole into tight frictional contact with the peripheral face of the brake-drum 1. As the lever 10 is turned about the axis of cam or wedge member 9 away from end lug 5 toward end lug 6 and spring 7 and out of alignment with lever K, the rounded corner face 9a of said wedge member 9 and its diagonally opposite corner 9b will engage the respective adjacent oposed faces of end lugs 5 and 6, so forcing end lug 6 away from end lug 5 against the action of spring 7, thus releasing the frictional grip of said brake-band 3 on said drum 1 in accordance with the degree of spreading movement between said end lugs, or of said end lug 6 with relation to end lug 5.

In the preferred embodiment illustrated it is necessary to round off one of the corners adjacent to end lug 5 in order to permit the turning movement of wedge or cam member 9 with relation thereto, said turning of wedge of cam member 9 being necessary to spread, or release the grip of, brake-band 3. However, since corner 9c is not rounded off, the wedge operating or release lever 10 cannot be moved in the reverse rotary direction toward end lug 5 beyond the position shown in Figures 3 and 4, so that in order to move the wedge or cam member 9 to spread or expand the brake-band 3 it is necessary to turn the lever 10 toward end lug 6 and spring 7 which movement corresponds in direction to the direction of rotation of said brake-band 3 with crank-lever K about the axis of shaft H as the rack-bar E with its teeth F in mesh with pinion G moves upward through the tubular or sleeve portion of the housing D in lowering the lower end of a compressed valve-spring O to engage or fit about the vertical annular collar of a conventionally indicated retaining cup, washer, collar or block P held positioned on the mushroomed or other specially formed lower end, not shown, of a valve-stem Q of the valve R against the upper face of which the foot 11 of the rack-bar E bears.

Assuming that the tool is applied with its foot 11 bearing on the upper face of valve R of an engine, conventionally and very fragmentarily indicated at N, with its jaws b on the lower end of its frame A beneath and against the lower end of the valve-spring O and the parts moved to the relative positions as shown in Fig. 1 and held therein by the grip of brake-band 3 on drum 1, with the retaining cup, collar or block P held in proper relation and position on valve-stem Q by the thumb and forefinger of the mechanic's left hand, and that it is desired to lower the lower end of the spring O to fit about the collar of retainer cup, collar or block P, the mechanic does not take hold of the lever K, but with his right hand shoves the release lever 10 about the axis of wedge or cam member 9 toward end lug 6 and spring 7 as indicated in Fig. 1 wherein the mechanic is illustrated as gripping said lever 10 between the thumb and forefinger of his right hand. If he shoves too hard at first the brake-band 3 and crank-lever K will turn quickly and catch up with, or overrun his right hand, resulting in bringing the levers 10 and K into, or more nearly into, alignment and so automatically applying the brake-band 3 in greater degree of frictional grip to the brake-drum 1, so slowing up or definitely stopping the movement of the rack-bar E upward through the housing D, or relative movement between the rack-bar E and frame A, so that the mechanic can very delicately and certainly control the lowering operation at all stages without fear of injury to his thumb and finger on the retainer cup, block or washer P.

The lower end of the rack-bar E will preferably be reduced in cross-section to form a shoulder or shoulders 12 and will have its extreme lower end pointed as illustrated in Fig. 5 to fit into a corresponding conical bore or countersink formed in some valves, said point aiding in quickly centering the foot. The adjustable foot 11 having an enlarged lower end with a concave lower end face has a central bore which receives said reduced end portion of rack-bar E. A screw 13 working through the side of foot 11 is adapted to engage in one of a plurality of recesses or bores formed in said reduced end portion at different distances from the point thereof, two such recesses being indicated by dotted lines in Fig. 5, the purpose of such adjustability being to allow the foot 11 to be moved up to the position shown in full lines in Fig. 5 so that said pointed lower end of rack-bar E may project below the adjacent portion of the lower face of said foot 11 into the conical center bore in the top of a valve R while the lower face of said foot 11 is in contact with the upper face of said valve R to give a large area contact and prevent rocking or wobbling of the lifter as a whole, or so that said foot 11 may be moved down to cover said point and prevent its contact with a valve R in which there is no center conical bore, as indicated by dotted lines in Fig. 5.

By connecting the brake-band at one point only to the crank-lever K, and that near its extreme end in end lug 5, by turning the brake-lever K in the direction toward end lug 5 as is necessary to force the foot 11 toward jaws b, there is a slight pulling of the end lug 5 away from end lug 6 with consequent slight expansion of the brake-band 3, so that the pinion G may be turned in that direction by the application of a little additional force even though the wedge or cam member 9 has been moved to the position shown in Figures 3 and 4 to allow the brake-band to contract under the influence of spring 7 to grip brake-drum 1. However, any attempt to turn the lever K toward end lug 6 serves to force the end lug 5 toward end lug 6, thus aiding in contracting the brake-band 3, so that after the cam or wedge member 9 has been turned to the position shown in Figures 3 and 4, a greatly excessive force is necessary to turn the crank-lever K toward end lug 6.

In normal use, with the tool applied to the valve assemblage as illustrated in Fig. 1, the wedge or cam member 9 is turned to its release position at right angles to the position shown in Figs. 3 and 4, thus expanding the brake-band 3 so as to be freely rotatable about brake-drum 1, the crank-lever K is then turned toward end lug 5 to turn pinion G in the proper direction to force rack-bar E toward jaws b until the mechanic has raised the lower end of valve-spring approximately to the point desired, when he moves lever 10 into alignment with crank-lever K to thereby move wedge or cam member 9 to the position shown in Figs. 3 and 4. If he thereafter desires to raise the spring a little he may do so, as above mentioned, by simply turning the crank-lever K toward end lug 5 without operating wedge or cam member 9.

In the modification illustrated in Figure 7 the construction and operation are in all respects the same as in the preferred form above described, except that we form the opposing faces of end lugs 5a and 6a of unbroken area and instead of the compressing spring 7 with its adjusting bolt or screw 8 we provide a wide caliper type leaf-spring 7a engaging in a transverse slot in the outer face of end lug 5a and having its other end wrapped or curled around a rod 8c which is formed with an internally screw-threaded transverse bore to receive an adjusting screw 8a which works through said bore and bears in a recess 8b in the outer face of end lug 6a, said rod 8c being free to turn in the end coil of said spring 7c which is formed with registering slots 8d to receive the screw 8a and allow said coil to turn about the rod 8c with relation to screw 8a in accordance with the adjustment of the latter through said bar 8c.

In the modification illustrated in Fig. 8 the construction and operation are in all respects the same as in the preferred form, except that the frame A' is made of two or more thicknesses of heavy sheet metal suitably secured together, as by rivets C, down to near the lower end portion of the back of the frame, and two of the thicknesses of metal being resilient and sprung at their lower portions to form diverging members B', in substitution of jaw member B, and have their outer end portions formed with opposed jaws b' in substitution of jaws b, and are adjustable toward and from each other by means of a transverse bolt S passing through said jaw members B' and receiving a cooperating adjusting wing nut T.

Having thus described our invention, what we claim as new and desire to secure by Letters Patent is:

1. A valve-spring lifting tool comprising a frame having a housing, a rack-bar mounted in said housing, a pinion mounted for rotation in said housing and meshing with the teeth of said rack-bar to reciprocate the latter in said housing, a shaft turning with said pinion, and a crank-lever connected with said shaft to turn therewith, in combination with a brake-drum secured to said housing against rotation, a thick resilient split metal brake-band arranged adjacent to and concentrically about said brake-drum and having an anchored end and a movable end, a pin connecting said anchored end to said crank lever to be immovable in a peripheral direction with relation thereto and to turn therewith about said brake-drum, adjustable resilient means for forcing said movable end toward said anchored end to contract said brake-band, a spreading member rotatably mounted in said crank-lever and extending between the opposed end faces of said brake-band, and a lever mounted on the forward end of said spreading member in front of said crank-lever to turn with said spreading member about its axis, said spreading member being provided with a portion adapted to engage a related element to prevent rotary movement of said spreading member about its axis from its inoperative position in one direction.

2. A valve-spring lifting tool comprising a frame having a housing, a thrust-bar mounted in said housing, a gear mounted for rotation in said housing to reciprocate said thrust-bar therein, a shaft turning with said gear, and a crank-lever connected with said shaft to turn therewith, in combination with a brake-drum secured to said housing against rotation, a split brake-band arranged about said brake-drum and having an anchored end and a movable end, means connecting said anchored end to said crank-lever to be immovable in a peripheral direction with relation thereto and to turn therewith about said brake-drum, adjustable resilient means for forcing said movable end toward said anchored end to contract said brake-band into frictional gripping contact with the opposed peripheral face of said brake-drum, a spreading member rotatably mounted in said crank-lever and extending between the opposed end faces of said brake-band, and a lever connected to said spreading member to turn therewith about its axis, said spreading member being provided with a portion adapted to engage a related element to prevent rotary movement of said spreading member about its axis from its inoperative position in one direction.

3. A valve-spring lifting tool comprising a frame having a housing, a thrust-bar mounted in said housing, a gear mounted for rotation in said housing to reciprocate said thrust-bar therein, and a crank-lever connected with said gear to turn therewith, in combination with a brake-drum secured to said housing against rotation, a split brake-band arranged concentrically about said brake-drum and having an anchored end and a movable end and being freely floating in all parts except said anchored end, means for connecting said anchored end to said crank-lever to turn therewith about said brake-drum when said brake-band is in expanded condition, and adjustable resilient means for forcing said movable end toward said anchored end to contract said brake-band into gripping contact with the peripheral face of said brake-drum.

4. A valve-spring lifting tool comprising a frame having a housing, a thrust-bar mounted in said housing, a gear mounted for rotation in said housing to reciprocate said thrust-bar therein toward and away from said frame, and a crank-lever connected with said gear to turn when the latter rotates, in combination with a brake-drum secured against rotation, a split brake-band arranged concentrically about said brake-drum, means connecting said brake-band to said crank-lever to turn therewith about said brake-drum, means for forcing one end of said brake-band toward the other end thereof to contract said brake-band, a spreading member rotatably mounted in said crank-lever and extending between the opposed end faces of said brake-band and operable to move one of said ends of the brake-band away from the other end thereof, said spreading member being provided with a portion adapted to engage a related element to prevent rotation of said spreading member about its axis from its inoperative position in a direction opposite to the direction of rotation of said crank lever during the reciprocatory movement of said thrust bar away from said frame.

5. A valve-spring lifting tool comprising a frame having a housing, a thrust-bar mounted in said housing, a gear mounted for rotation in said housing to reciprocate said thrust-bar therein toward and away from said frame, and a crank-lever connected with said gear to turn when the latter rotates, in combination with a fixed brake-element secured against rotation, a complementary brake-element turning with said crank-lever and adapted at will to grip said fixed brake-element, and a member rotatably mounted in said crank-lever for controlling the relation between said brake-elements.

6. A valve-spring lifting tool comprising a frame having a housing, a thrust-bar mounted in said housing, a gear mounted for rotation in said housing to reciprocate said thrust-bar, and a crank-lever for turning said gear, in combination with a brake-element fixed with relation to the axis of said crank-lever, a complementary brake-element turning with said crank-lever about the axis of the latter, and a member rotatably mounted in said crank-lever and cooperating with said complementary brake-element and so formed as to permit the latter to engage said fixed brake-element when said rotatable member is in its inoperative position and to separate said complementary brake-element from said fixed brake-element as said rotatable member is turned in one direction about its axis, said rotatable member being so formed as to permit its movement about its axis in one direction from its inoperative position, while preventing its movement from its inoperative position in the reverse direction about its axis.

7. A valve-spring lifting tool comprising a frame having a housing, a thrust-bar mounted in said housing, a gear mounted for rotation in said housing to reciprocate said thrust-bar, and a crank-lever connected with said gear to turn when the latter rotates, in combination with a brake-drum secured to said housing against rotation, a split brake-band arranged concentrically with relation to said brake-drum, means connecting said brake-band to said crank-lever to turn therewith, and a spreading member rotatably mounted in said crank-lever and extending between the opposed end faces of said brake-band, said spreading member being provided with a portion adapted to engage a related element to prevent rotation of said spreading member about its axis from its inoperative position in a direction opposite to the direction of rotation of said crank lever during the reciprocatory movement of said thrust bar away from said frame.

8. A valve-spring lifting tool comprising a frame having a housing, a thrust-bar mounted in said housing, a gear mounted for rotation in said housing and engaging said thrust-bar to reciprocate the same in said housing toward and away from said frame, and a crank-lever connected with said gear to turn therewith, in combination with a brake-element fixed with relation to the axis of said crank-lever, a complementary brake-element turning with said crank-lever and adapted to frictionally engage said fixed brake-element, and release means carried by said crank-lever and operable to control the relation of said complementary brake-element to said fixed brake-element.

9. A valve-spring lifting tool comprising a frame having a housing, a thrust-bar mounted in said housing, a gear mounted for rotation in said housing and engaging said thrust-bar to reciprocate the same in said housing toward and away from said frame, and a crank-lever connected with said gear to turn when said gear rotates, in combination with a brake-element fixed with relation to the axis of said crank-lever, a complementary brake-element turning with said crank-lever and adapted to frictionally engage said fixed brake-element, and control means carried by said crank-lever and operable from an initial control position only in the direction of rotation of said crank-lever as the latter turns during the reciprocatory movement of said thrust-bar away from said frame.

In testimony whereof, we have signed our names to this specification at Lancaster, Pennsylvania, this eleventh day of June, 1929.

HARRY W. KULP.
MARTIN C. DELLINGER.